(12) United States Patent
Zattin et al.

(10) Patent No.: US 10,563,339 B2
(45) Date of Patent: Feb. 18, 2020

(54) LAUNDRY WASHING MACHINE AND METHOD FOR CONTROLLING A LAUNDRY WASHING MACHINE

(71) Applicant: Electrolux Appliances Aktiebolag, Stockholm (SE)

(72) Inventors: Andrea Zattin, Solesino (IT); Elisa Stabon, Gorizia (IT)

(73) Assignee: Electrolux Appliances Aktiebolag (SE)

( * ) Notice: Subject to any disclaimer, the term of this patent is extended or adjusted under 35 U.S.C. 154(b) by 589 days.

(21) Appl. No.: 15/108,985

(22) PCT Filed: Jul. 7, 2014

(86) PCT No.: PCT/EP2014/064414
§ 371 (c)(1),
(2) Date: Jun. 29, 2016

(87) PCT Pub. No.: WO2015/101425
PCT Pub. Date: Jul. 9, 2015

(65) Prior Publication Data
US 2016/0326683 A1    Nov. 10, 2016

(30) Foreign Application Priority Data

Dec. 30, 2013  (WO) .................. PCT/EP2013/078133
Dec. 30, 2013  (WO) .................. PCT/EP2013/078134
Dec. 30, 2013  (WO) .................. PCT/EP2013/078135

(51) Int. Cl.
*D06F 39/00* (2006.01)
*D06F 33/02* (2006.01)
(Continued)

(52) U.S. Cl.
CPC ............ *D06F 39/007* (2013.01); *B01J 39/04* (2013.01); *C02F 1/42* (2013.01); *C02F 1/4691* (2013.01);
(Continued)

(58) Field of Classification Search
CPC .................................................... D06F 39/007
See application file for complete search history.

(56) References Cited

U.S. PATENT DOCUMENTS 5,167,722 A   12/1992  Pastryk et al.
5,272,892 A   12/1993  Janutka et al.
(Continued)

FOREIGN PATENT DOCUMENTS

CH         704603 A2    7/2012
DE       3519831 A1   12/1986
(Continued)

OTHER PUBLICATIONS

Non Final Office Action for U.S. Appl. No. 15/108,815, dated Dec. 14, 2018, 32 pages.
(Continued)

*Primary Examiner* — Michael E Barr
*Assistant Examiner* — Jason P Riggleman
(74) *Attorney, Agent, or Firm* — RatnerPrestia

(57) ABSTRACT

Laundry washing machine (1) having an outer casing (2), a washing tub (3), arranged inside the casing (2), a rotatable drum (4), arranged in axially rotating manner inside the washing tub (3) and designed to receive laundry to be washed, and a detergent dispensing assembly (12), designed for supplying laundry detergent into the washing tub (3). The washing machine also has a water softening system (14), designed to receive fresh water from a water mains (13) and reduce the hardness degree of the fresh water in order to supply softened water to the detergent dispensing assembly (12) and/or to the washing tub (3), during one or more softened water laundry washing phases of a laundry washing program. A control panel is configured to allow an operator to input information associated with the kind of laundry to be washed, and an electronic controller (15) is (Continued)

configured to receive information and to control water softening system (14) in order to perform one or more softened water laundry washing phases during washing program, based on received laundry information.

25 Claims, 6 Drawing Sheets

(51) Int. Cl.

| | |
|---|---|
| *C02F 1/469* | (2006.01) |
| *D06F 37/04* | (2006.01) |
| *D06F 39/02* | (2006.01) |
| *B01J 39/04* | (2017.01) |
| *C02F 1/42* | (2006.01) |
| *G05B 19/042* | (2006.01) |
| *C02F 101/10* | (2006.01) |

(52) U.S. Cl.
 CPC .............. *D06F 33/02* (2013.01); *D06F 37/04* (2013.01); *D06F 39/005* (2013.01); *D06F 39/02* (2013.01); *G05B 19/0426* (2013.01); *C02F 2101/10* (2013.01); *C02F 2303/22* (2013.01); *C02F 2307/12* (2013.01); *G05B 2219/2633* (2013.01)

(56) References Cited

U.S. PATENT DOCUMENTS

| | | | |
|---|---|---|---|
| 6,169,964 B1 | 1/2001 | Aisa et al. | |
| 6,557,382 B1 | 5/2003 | Koike et al. | |
| 2005/0103631 A1 | 5/2005 | Freydina et al. | |
| 2005/0252538 A1* | 11/2005 | Vernon | B82Y 30/00 134/94.1 |
| 2007/0028397 A1 | 2/2007 | Park et al. | |
| 2008/0000272 A1 | 1/2008 | Park et al. | |
| 2009/0114598 A1 | 5/2009 | van Kralingen et al. | |
| 2010/0287709 A1 | 11/2010 | Doyle et al. | |
| 2012/0174631 A1 | 7/2012 | Cho et al. | |
| 2012/0180227 A1* | 7/2012 | Kim | D06F 35/00 8/137 |
| 2012/0203391 A1 | 8/2012 | Lee | |
| 2013/0263387 A1 | 10/2013 | Aykroyd et al. | |
| 2015/0368848 A1* | 12/2015 | Del Pos | D06F 39/007 8/137 |

FOREIGN PATENT DOCUMENTS

| | | |
|---|---|---|
| DE | 19940162 A1 | 3/2001 |
| DE | 102005049078 A1 | 4/2007 |
| DE | 102010028445 A1 | 11/2011 |
| DE | 102013206359 A1 | 10/2014 |
| EP | 0467028 A1 | 1/1992 |
| EP | 0749720 A1 | 12/1996 |
| EP | 0861114 A1 | 9/1998 |
| EP | 1085118 A2 | 3/2001 |
| EP | 2486180 B1 | 8/2012 |
| EP | 2565319 A1 | 3/2013 |
| EP | 2657387 A1 | 10/2013 |
| GB | 1442616 A | 7/1976 |
| JP | 2001017775 A | 1/2001 |
| WO | 2006079417 A1 | 8/2006 |
| WO | 2007108645 A1 | 9/2007 |
| WO | 2009066940 A2 | 5/2009 |
| WO | 2011042341 A1 | 4/2011 |
| WO | 2011080241 A1 | 7/2011 |

OTHER PUBLICATIONS

Non Final Office Action for U.S. Appl. No. 15/108,895, dated Nov. 28, 2018, 15 pages.
Non Final Office Action for U.S. Appl. No. 15/108,816, dated Jul. 2, 2018, 21 pages 2018.
International Search Report in corresponding International Application No. PCT/EP2014/064414 dated Sep. 17, 2014.
International Search Report in corresponding International Application No. PCT/EP2014/064413 dated Sep. 17, 2014.
International Search Report in corresponding International Application No. PCT/EP2013/078133 dated Mar. 25, 2014.
International Search Report in related International Application No. PCT/EP2013/078135, dated Oct. 6, 2014.
International Search Report issued in related International Application No. PCT/EP2013/078134, dated Jul. 28, 2014.
Final Office Action for U.S. Appl. No. 15/108,816, dated Oct. 11, 2018, 17 pages.
Non Final Office Action for U.S. Appl. No. 15/108,816, dated Feb. 21, 2019, 17 pages.
Australian Examination Report for Australian Application No. 2013409579, dated Feb. 4, 2019, 4 pages.
Final Office Action for U.S. Appl. No. 15/108,895, dated Mar. 21, 2019, 7 pages.
Final Office Action for U.S. Appl. No. 15/108,815, dated Mar. 21, 2019, 18 pages.
Non Final Office Action for U.S. Appl. No. 15/108,814, dated Jun. 14, 2019, 11 pages.
Notice of Allowance for U.S. Appl. No. 15/108,895, dated Jun. 4, 2019, 7 pages.
Notice of Allowance for U.S. Appl. No. 15/108,816, dated Jul. 17, 2019, 14 pages.
U.S. Appl. No. 15/108,814 Entitled: Laundry Washing Machine and Method for Controlling a Laundry Washing Machine International Application No. PCT/EP2013/078133.
U.S. Appl. No. 15/108,816 Entitled: Laundry Washing Machine With Water Softening System and Method for Controlling a Laundry Washing Machine International Application No. PCT/EP2013/078135.
U.S. Appl. No. 15/108,815 Entitled: Laundry Washing Machine With Water Softening System and Method for Controlling a Laundry Washing Machine International Application No. PCT/EP2013/078134.
U.S. Appl. No. 15/108,895 Entitled: Laundry Washing Machine and Method for Controlling a Laundry Washing Machine International Application No. PCT/EP2014/064413.
Notice of Allowance for U.S. Appl. No. 15/108,814, dated Oct. 4, 2019, 17 pages.

* cited by examiner

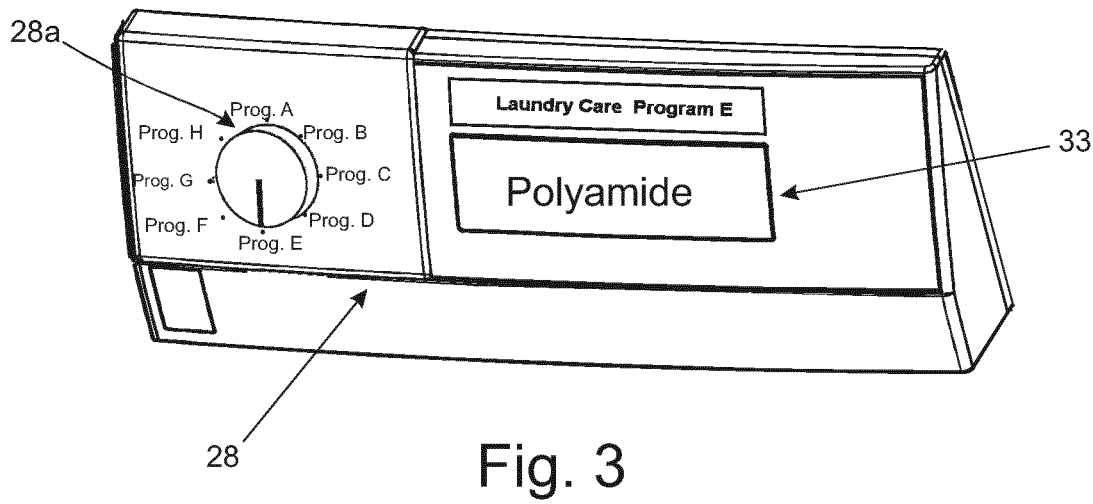

Fig. 3

| washing program User selection | Main Wash phase | Secondary laundry wash phases ||||| 
|---|---|---|---|---|---|---|
| | | First Rinse | Second Rinse | .... Rinse | .... Rinse | Last Rinse |
| Laundry care washing program A | Mix. Water | Fresh Water | Fresh Water | Fresh Water | Fresh Water | Fresh Water |
| Laundry care washing program B | Mix. Water | Mix. Water | Fresh Water | Fresh Water | Fresh Water | Fresh Water |
| Laundry care washing program C | Mix. Water | Mix. Water | Mix. Water | Mix. Water | Mix. Water | Mix. Water |
| Laundry care washing program D | Soft. Water | Mix. Water | Mix. Water | Mix. Water | Fresh Water | Fresh Water |
| Laundry care washing program E | Soft. Water | Mix. Water | Mix. Water | Mix. Water | Fresh Water | Fresh Water |
| Laundry care washing program F | Fresh. Water | Mix. Water | Mix. Water | Mix. Water | Soft. Water | Mix. Water |
| | | | | | | |
| Laundry care washing program N-1 | Soft. Water | Soft. Water | Soft. Water | Soft. Water | Soft. Water | Mix. Water |
| Laundry care washing program N | Soft. Water | Soft. Water | Soft. Water | Soft. Water | Soft. Water | Soft. Water |

Fig. 4

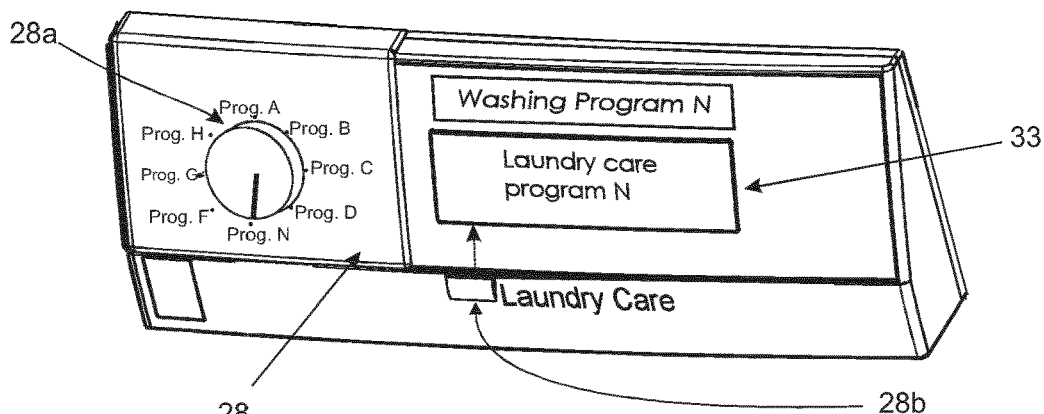

Fig. 7

| User selection | washing program | Main Wash | Following laundry washing phases | | | | |
|---|---|---|---|---|---|---|---|
| | | | First Rinse | Second Rinse | .... Rinse | .... Rinse | Last Rinse |
| Course A (knob) | Softned water washing program A | Mix. Water | Fresh Water | Fresh Water | Fresh Water | Fresh Water | Fresh Water |
| Button (once) | Laundry care washing program A | Mix. Water | Mix. Water | Fresh Water | Fresh Water | Fresh Water | Fresh Water |
| Button (twice) | Laundry care washing program A1 | Mix. Water | Soft. Water | Fresh Water | Fresh Water | Fresh Water | Fresh Water |
| Course B (knob) | Softned water washing program B | Fresh Water | Mix. Water | Mix. Water | Fresh Water | | Fresh Water |
| Button (once) | Laundry care washing program B | Fresh Water | Mix. Water | Mix. Water | Soft water | | Fresh Water |
| Button (twice) | Laundry care washing program B1 | Fresh Water | Soft. Water | Mix. Water | Soft water | | Fresh Water |
| Course N (knob) | Softned water washing program N | Mix Water | Mix Water | Mix. Water | | | Mix Water |
| Button (once) | Laundry care washing program N | Soft Water | Soft Water | Mix. Water | | | Soft Water |
| Button (twice) | Laundry care washing program N | Soft Water | Soft Water | Soft Water | | | Soft Water |

Fig. 8

LAUNDRY WASHING MACHINE AND METHOD FOR CONTROLLING A LAUNDRY WASHING MACHINE

FIELD

The present invention concerns the field of laundry washing techniques.

In particular, the present invention refers to a laundry washing machine and a method for controlling a laundry washing machine provided with a water softener system. More particularly, to a front-loading home laundry washing machine designed to perform laundry care functions and control method thereof, to which the following description refers purely by way of example without this implying any loss of generality.

BACKGROUND

Nowadays the use of laundry treatment appliances, such as laundry washing machines, i.e. laundry washing machines which wash and rinse laundry, or laundry washing and drying machines, i.e. laundry washing machines which can also dry laundry, is widespread. In this respect, in the present description, where not stated differently, the term "laundry washing machine" can be referred to a laundry washing machine, or a laundry washing and drying machines.

Laundry washing machines generally comprise an external casing provided with a washing tub which comprises a rotatable perforated drum where the laundry is placed, an electric motor which rotates the drum in the washing tub, a water-detergent supplying system, which supplies fresh water and detergent into the washing tub/drum, and a water draining system which discharges/drains wash water/detergent from the washing tub.

Laundry washing machines further comprise a control panel provided for an user to select a laundry washing program to be performed, such as cotton, delicates wool, silk etc. and a controller configured to control several operating devices/apparatus of the laundry washing machine so as to perform the laundry washing phases based on the selected laundry washing program.

It is also known that one of washing problems in said laundry washing machines is the so called "greying phenomenon" of the laundry textile. Indeed greying phenomenon happens because the suspended soils in the washing liquor drop in the fibers surfaces and cause the greying effect on the washed laundry. Generally, in known laundry washing machine, detergent and washing cycles are designed in order to prevent this graying effect. However results are considered unsatisfactory and reduction of greying effect on laundry depends on the kind of fabric and/or other washing parameters.

The Applicant conducted an in-depth study with the objective of providing a laundry washing machine which is designed to reduce greying effect on the washed laundry.

SUMMARY OF SELECTED INVENTIVE ASPECTS

According to aspects of the present invention, there is provided a laundry washing machine comprising: an outer casing, a washing tub, which is arranged inside the casing, a rotatable drum, which is arranged in axially rotating manner inside the washing tub and is designed to receive laundry to be washed, a detergent dispensing assembly, which is designed for supplying laundry detergent into the washing tub, a water softening system, which is designed to receive fresh water from a water mains and reduce the hardness degree of the fresh water in order to supply softened water or mix water to the detergent dispensing assembly and/or to the washing tub, during one or more softened water laundry washing phases or respectively during one or more mix water laundry wash phase; said mix water being a mixture of fresh water and softened water; a control panel configured to allow an operator to input information associated with the laundry to be washed; electronic control means which are configured to receive said laundry information and control said water softening system in order to perform one or more softened water laundry washing phases and/or one or more mix water laundry wash phases of a washing program, based on said received laundry information.

Preferably, said laundry information are associated with the fabric of the laundry to be washed.

Preferably, said control panel is configured to allow operator to select a washing program among one or more predetermined laundry care washing programs, wherein laundry care washing programs comprises one or more softened water laundry washing phase/s and/or one or more mix water laundry wash phases.

Preferably, said washing program comprises a main laundry wash phase and one or more secondary laundry wash phases following the main laundry wash phase; said main laundry wash phase comprises at least a wetting phase, a maintenance phase and a drain phase; said secondary laundry wash phases comprising one or more rinse phases which start after the end of said drain phase of the main laundry wash phase.

Preferably, said predetermined laundry care washing programs comprise: performing a fresh water laundry washing phase during the main wash phase, and performing one or more mix water laundry washing phase/s and/or one or more softened water laundry washing phases during the secondary wash phases.

Preferably, said predetermined laundry care washing programs comprise: performing a mix or softened water laundry washing phase during the main wash phase, and performing one or more mix or softened or fresh water laundry washing phase/s during the secondary wash phases.

Preferably, predetermined laundry care washing programs comprises performing softened water laundry washing phases during the main and the second wash phases.

Preferably, the laundry washing machine comprises memory means containing data relating to one or more laundry care washing programs, said memorized data being indicative of loading of softened water or fresh water or mix water to the detergent dispensing assembly and/or the washing tub during corresponding laundry washing phases of laundry care washing programs; said electronic control means being configured to selectively control/activate said water softening system based on said selected laundry care washing program.

Preferably, said control panel comprises a first select part configured to allow operator to input first information indicative of a laundry washing program; a second select part configured to allow operator to input second information indicative of one or more laundry care commands; said electronic control means being configured to determine/set a laundry care washing program to be performed based on received first and second information.

Preferably, said first select part is configured to allow operator to select a laundry washing program among one or more predetermined fresh water laundry washing programs, wherein said fresh water laundry washing program comprises only fresh water washing phases; said electronic control means being further configured to set the laundry care washing program based on the selected fresh water laundry washing program and said laundry care commands.

Preferably, said electronic control means are further configured to set the laundry care washing program by replacing one or more fresh water washing phases of the selected fresh water washing program with respective softened water washing phases ad/or mix water laundry washing phases, based on said laundry care commands, and control said water softening system in response to the set laundry care washing program.

Preferably, said first select part is configured to allow operator to select a laundry washing program among one or more predetermined softened water laundry washing programs, wherein a softened water laundry washing program comprises at least a softened or mix water laundry washing phase; said electronic control means being further configured to set said laundry care washing program based on the selected softened water laundry washing program and said laundry care commands.

Preferably, said electronic control means is further configured to determine/set the laundry care washing program by replacing one or more mix or fresh water washing phases of the softened water washing program with softened water washing phases ad/or mix water laundry washing phases respectively, based on said laundry care commands; and control said water softening system in response to the set laundry care washing program.

Preferably, softened water has a reduced hardness degree which is lower than about 15 FH.

Preferably, wherein softened water has a reduced hardness degree which is lower or equal than about 5 FH.

Preferably, softened water has a reduced hardness degree which is lower or equal than about 2 FH.

Preferably, softened water has a reduced hardness degree which is lower or equal than about 1 FH.

Preferably, mix water has a reduced hardness degree which is greater than, or equal to about 15 FH, and lower than, or equal to about 25 FH.

Preferably, said water softening system comprises a water-softening agent container, which is filled with a given amount of ion-exchange resins capable to restrain the calcium and/or magnesium ions dissolved in the fresh water flowing across the water-softening agent container, and a regeneration-agent reservoir which is structured for receiving a given amount of salt grains and is designed to uses brine to periodically regenerate said ion-exchange resins contained in said water-softening agent container.

Preferably, the water softening system comprises at least a system based on capacitive deionization technology.

Preferably, a laundry care washing program comprises a cotton care washing program, in which: the main wash phase is a softened water washing phase and the final rinse phase of the secondary laundry wash phases is a fresh water washing phase.

Preferably, a laundry care washing program comprises a cotton care washing program, in which: the main wash phase is a softened water washing phase, the first rinse phase is a softened water washing phase, second rinse phase is a mix water washing phase, and the final rinse phase is a mix water washing phase.

Preferably, laundry care washing program comprises a polyamide care washing program, in which: the main wash phase is a softened water washing phase, and the final rinse phase of the secondary laundry wash phases is a fresh water washing phase.

Preferably, electronic control means are configured to control said water softening system based on said input laundry information, in order to supply water to the detergent dispensing assembly and/or to the washing tub during all the washing phases, wherein said supplied water has a hardness degree lower than said fresh water.

BRIEF DESCRIPTION OF THE DRAWINGS

Further characteristics and advantages of the present invention will be highlighted in greater detail in the following detailed description of some of its preferred embodiments, provided with reference to the enclosed drawings. In the drawings, corresponding characteristics and/or components are identified by the same reference numbers. In particular:

FIG. 3 schematically illustrates a first embodiment of an user control panel of the laundry washing machine illustrated in FIG. 1;

FIG. 4 shows an example of a table containing laundry care washing programs selectable by the control panel illustrated in FIG. 3;

FIG. 7 schematically illustrates a third embodiment of an user control panel of the laundry washing machine illustrated in FIG. 1;

FIG. 8 shows an example of a table containing laundry care washing programs selectable by the control panel illustrated in FIG. 7.

DETAILED DESCRIPTION OF EXAMPLE EMBODIMENTS

The present invention has proved to be particularly advantageous when applied to a laundry treatment machine, such as laundry washing machines, as described below.

It should be understood that although the present invention is described with reference to a laundry washing machine, other applications are contemplated. As can be appreciated, the present invention can be conveniently applied to other laundry treatment appliances, like for example laundry washing and drying machines (called also washer/driers), wherein one or more steps of introducing water and/or steam and/or hot/cool air inside a laundry tub may be required.

Figure 1:
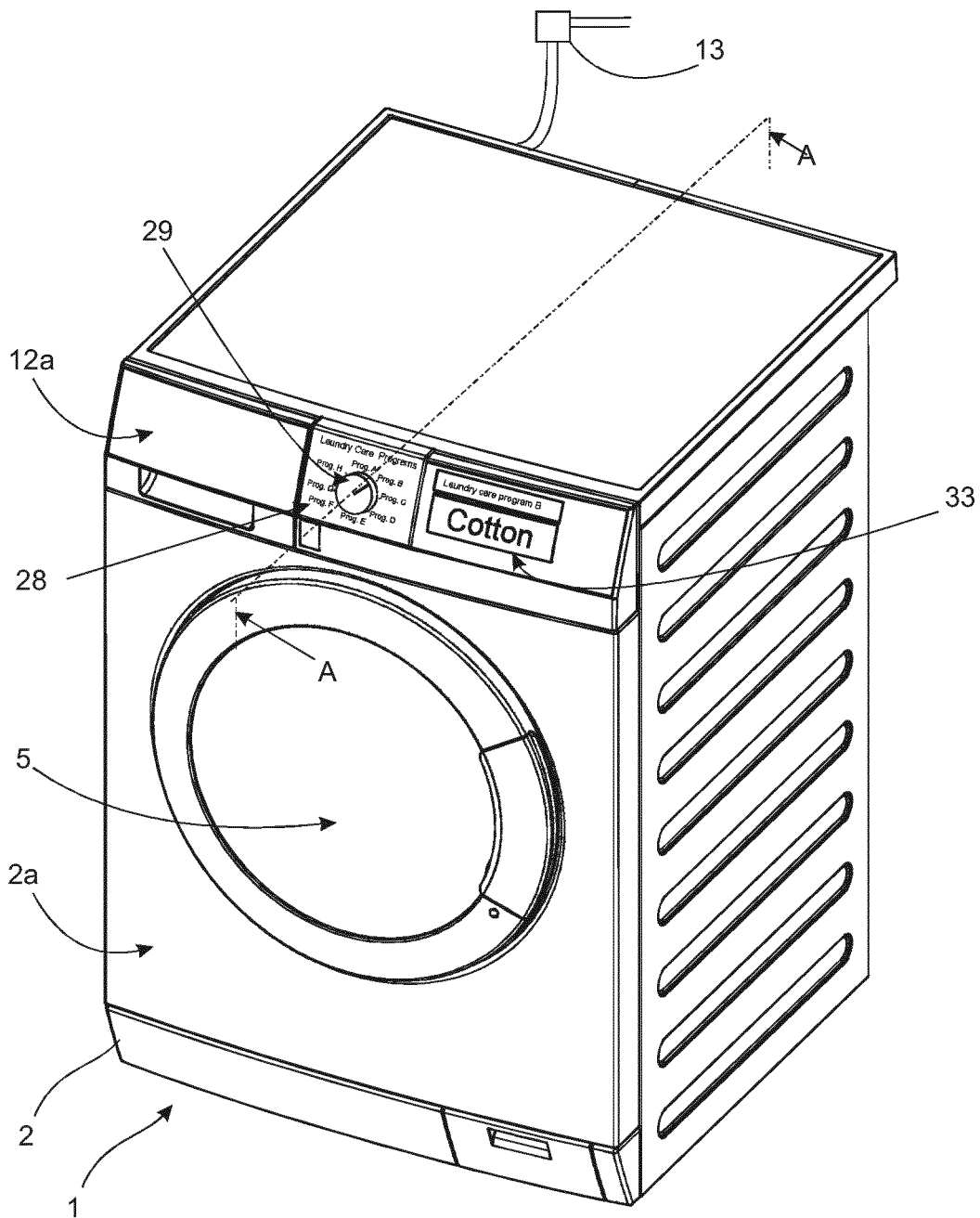
FIG. 1 is a schematic perspective view of a laundry washing machine according to an aspect of the present invention.
Figure 2:
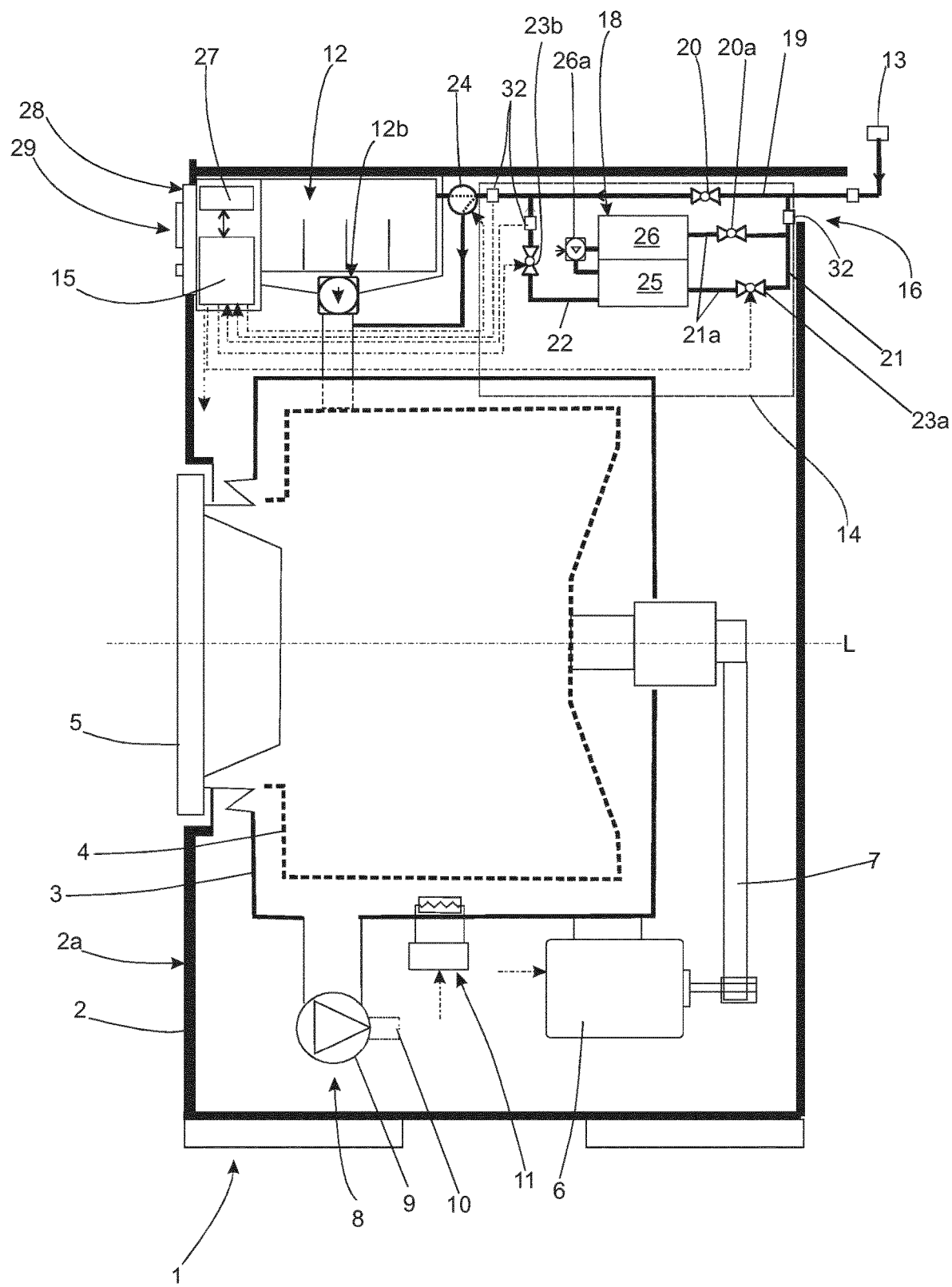
FIG. 2 is a longitudinal cross-sectional schematic view taken along line A-A in FIG. 1, with some parts/components of the machine removed for clarity.

With reference to FIGS. 1 and 2, reference number 1 indicates as a whole a home laundry washing machine which comprises: a preferably, though not necessarily, substantially parallelepiped-shaped, rigid outer boxlike casing 2, which is structured for resting on the floor; a preferably substantially cylindrical, bell-shaped hollow washing tub 3, which is arranged inside the casing 2 with its opening or mouth directly facing a laundry loading/unloading pass-through opening realized in the front wall 2a of boxlike casing 2; a preferably substantially cylindrical, elastically-deformable bellows (not shown) watertight connecting the front opening or mouth of washing tub 3 to the laundry loading/unloading opening realized in the front wall 2a of casing 2; and a substantially cylindrical, bell-shaped revolving perforated drum 4 structured for housing the laundry to be washed, and which is housed in axially rotating manner inside the washing tub 3 so as to be able to freely rotate about its longitudinal reference axis. In an alternative embodiment not shown, rotation axis may be vertical or inclined.

According to one embodiment, the revolving drum 4 is housed in axially rotating manner inside the washing tub 3 with its front opening directly faced/aligned to the laundry loading/unloading opening on the front wall 2a of casing 2, and the drum rotation axis is preferably arranged locally substantially coincident with the substantially horizontally-oriented longitudinal reference axis of washing tub 3.

Furthermore in the example shown, the hollow washing tub 3 is preferably suspended in floating manner inside the casing 2 via a suspension system preferably, though not necessarily, comprising a couple of upper coil springs (non illustrated) connecting the upper portion of the washing tub 3 to the top of the boxlike casing 2, and a couple of lower vibration dampers (not illustrated) connecting the bottom portion of the washing tub 3 to the bottom of the boxlike casing 2.

With reference to FIG. 1, the laundry washing machine 1 furthermore comprises a porthole door 5 which is hinged to the front wall 2a of casing 2 to rotate about a preferably, though not necessarily, vertically-oriented reference axis to and from a closing position in which the peripheral border of the porthole door 5 rests completely on front wall for closing the laundry loading/unloading opening and watertight sealing the washing tub 3; and an electrically-powered motor assembly 6 which is structured for driving into rotation the revolving drum 4 about its longitudinal reference axis inside the washing tub 3, by means of a belt/pulley system 7. In a different embodiment of the invention, the motor 6 may be directly associated with the shaft of the revolving drum 4.

With reference to FIG. 2, the laundry washing machine 1 furthermore comprises a water draining system 8 (only partially and schematically illustrated), which is configured to drain the wash water, i.e. dirty water and/or water mixed with washing and/or rinsing products, from the washing tub 3 to the outside. The water draining system 8 may comprise a draining pump 9 (schematically illustrated in FIG. 2), which is fluidly connected to a liquid outlet arranged on the bottom region of the washing tub 3 and is configured to drain the water from the washing tub 3 to supply the drained water into a draining suction pipe 10 (only partially illustrated in broken lines in FIG. 2).

As shown in FIG. 2, the laundry washing machine 1 may furthermore comprise a heating device 11 configured to heat the water solution loaded in the washing tub 3 to a prefixed temperature. In accordance with one exemplary embodiment, the heating device 11 may comprise one or more electric resistors or any similar/equivalent heating electric/electronic components which are arranged, for example, in the bottom of the washing tub 3 and/or in a sump of the washing tub 3 in order to heat the water loaded in the washing tub 3.

In this instance, the washing tub 3, the drum 4, the suspension system, the electrically-powered motor assembly 6, the heating device 11, and the water draining system 8 of the laundry washing machine 1 are well-known elements provided in well-known laundry machine and detailed description thereof will be omitted accordingly.

Terminology which will be used as follows is hereinafter defined.

More specifically, "FH" is the unit of measurement of water hardness degree corresponding to French degree, wherein 1 FH=10 ppm CaCo3 (Calcium Carbonate).

With the term fresh water, it will be understood a tap water provided by a water mains 13 usually arranged in a house. It should be understood that water mains 13 generally provides an "hard water", i.e. a water having a hardness degree greater than about 25 FH (250 ppm CaCo3).

With the term "softened water", it will be understood a water provided by a water softener system which will be disclosed in detail afterwards. In order to be effective for washing process the softened water may have an hardness degree lower than about 15 FH (150 ppm CaCo3), preferably lower than 5 FH (50 ppm CaCo3) and more preferably lower than 2 FH (20 ppm CaCo3). More preferably, according to a preferred embodiment, softened water may have an hardness degree lower than about 1 FH (10 ppm CaCo3).

With the term mix water, it will be understood a mixture of fresh water and softened water. Preferably, hardness degree of mix water may be comprised between about 15 and about 25 FH.

With "washing program", it will be understood a laundry washing cycle comprising a "main laundry wash phase", and one or more "secondary laundry wash phases" following the main laundry wash phase, wherein the secondary laundry wash phases may comprise one or more laundry rinse phases and preferably, although not necessarily, at least one laundry spin phase.

The main laundry wash phase may comprises, for example: a wetting phase (step of loading water and detergent into the washing tub), a maintenance phase (step of tumbling the laundry for detergent action) and preferably, although not necessarily, a spin phase (step of spinning the drum). If the program to be performed uses heated water, the main laundry wash phase can further comprise a heating phase (step of switching-on the heating device 11). The main laundry wash phase may further comprises a drain phase (step of draining water). It should be point out that drain phase is the last phase of the main laundry wash phase, and is performed before executing the first rinse phase of the secondary laundry wash phases following the main laundry wash phase.

Rinse phases following the main laundry wash phase, may comprise a water loading phase (loading water into the washing tub), a rinse maintenance phase (tumbling the laundry), a drain phase, and preferably a spin phase.

With "softened water laundry wash phase", it will be understood a laundry wash phase wherein softened water is supplied into the washing tub 3.

With "fresh water laundry wash phase" it will be understood a laundry wash phase wherein fresh water is supplied into the washing tub 3.

With "mix water laundry wash phase" it will be understood a laundry wash phase wherein mix water is supplied into the washing tub 3.

With "fresh water laundry washing program", it will be understood a laundry washing program wherein all the wash phases comprise the step of supplying fresh water into the washing tub 3.

With "softened water laundry washing program", it will be understood a laundry washing program comprising at least a softened water laundry washing phase or at least a mix water laundry washing phase. Preferably, the main wash phase of a softened washing program comprises the step of supplying softened water or mix water. Preferably, the secondary wash phase of a softened water laundry washing program comprises the step of supplying softened or mix or fresh water.

With "laundry care washing program", it will be understood a laundry washing program comprising laundry wash phases in order to improve the laundry care and reduce the greying phenomenon of the laundry. Preferably, a "laundry care washing program" may be configured in order to supply softened or mix water during the main wash phase, and preferably supply softened or mix water during one or more secondary laundry wash phases (rinse/spin phases) so as to perform corresponding "softened/mix water laundry wash phase/s".

With the term "detergent" it will be understood any kind of laundry cleansing-agent which is supplied into the washing tub 3 during the main wash phase.

As shown in FIG. 2, the laundry washing machine 1 furthermore comprises a detergent dispensing assembly 12, which is housed inside the casing 2 in easily reachable manner by the user, and is structured to supply into the washing tub 3, to detergent mixed with water. In one exemplary embodiment, the detergent dispensing assembly 12 may comprise a detergent drawer 12a (illustrated in FIGS. 1 and 2) which may be fitted/inserted in manually extractable manner into a completely recessed drawer housing (not illustrated), which extends substantially horizontally inside the boxlike casing 2, and is manually movable inside the drawer housing between a working position (illustrated in FIG. 1) and an extracted position (not illustrated). It should be understood that detergent dispensing assembly 12 may be structured for selectively spilling/pouring a given amount of fresh water arriving from a fresh water mains 13 directly into the detergent drawer 12a, so as to flush the detergent, out of the same detergent drawer 12a so that detergent mixed with water is loaded into the washing tub 3.

According to an embodiment the detergent dispensing assembly 12 may have a single-dose structure and is structured to supply into the washing tub 3 a dosage of detergent previously loaded by the user into the detergent drawer 12a.

However, it should be understood that according to a different embodiment, the detergent dispensing assembly 12 may have an auto-dosing system/structure. i.e. it is provided with an auto-dosing detergent device 12b designed to automatically control the amount of detergent supplied to into the washing tub 3. The auto-dosing detergent device 12b may comprise for example one or more detergent metering pumps (not illustrated), i.e. volumetric pumps for the metered feed of the detergent/water into the washing tub 3 based on control signals.

The laundry washing machine 1 furthermore comprises a water softener system 14, which is arranged inside the casing 2 between the water mains 13 and the detergent dispensing assembly 12, or between the water mains 13 and directly the washing tub 3, and is designed to reduce the hardness degree of the fresh water so as to provide softened water to the detergent dispensing assembly 12 or directly to the washing tub 3.

According to one simplified embodiment, the water softener system 14 may be structured to be activated/controlled so as to operate between a first operating state, wherein it provide softened water, and a second operating state, wherein it provides to fresh water. It should be understood however that other kind of water softener systems may be contemplated. As can be appreciated, the present invention can be conveniently applied to a water softener system which may be activated/controlled so as to selectively operate, in addition to the first and second operating states above disclosed, further in a third state wherein it provides mix water.

According to a simplified embodiment, the water softener system 14 may be designed to vary the hardness degree of the softened water and/or mix water, based on received control/command signals.

With regard to an exemplary embodiment illustrated in FIG. 2, the water softener system 14 may comprise a fresh water supply circuit 16, which is arranged inside the casing 2 between the water mains 13 and the detergent dispensing assembly 12 or between the water mains 13 and directly the washing tub 3, and may be structured so as to control/regulate the flow of fresh water from the water mains 13 towards the detergent dispensing assembly 12 and/or the washing tub 3. In accordance to the exemplary embodiment illustrated in FIG. 2, the machine 1 may preferably although not necessarily comprise an electric controlled flow diverter device 24 which is connected between the water softener system 14 and the detergent dispensing assembly 12/the washing tub 3, and is designed to receive fresh or softened or mix water from the water softener system 14 and selectively supply, on command, the received water to the detergent dispensing assembly 12 or the washing tub 3.

However, it should be understood that according to different embodiments, the water softener system 14 may comprise any other known device/system designed to selectively supply the received water to the detergent dispensing assembly 12 or the washing tub 3.

In accordance with one embodiment, the water softener system 14 further comprise an internal water softening device 18, which may be arranged along the fresh water supply circuit 16 between the water mains 13 and the detergent dispensing assembly 12, or the flow diverter device 24 if presents, so as to be crossed by the fresh water flowing from the water mains 13 towards the detergent dispensing assembly 12 or to directly towards the washing tub 3, and is structured to reduce the hardness degree of the fresh water drawn from the water mains 13 so as to provide the softened water to be channeled to the detergent dispensing assembly 12 or directly to the washing tub 3.

In accordance with one simplified exemplary embodiment shown in FIG. 2, the fresh water supply circuit 16 may preferably comprise a hosepipe 19 connecting the water mains 13 to the inlet of the detergent dispensing assembly 12 or to the washing tub 3, an electrically-controlled valve 20 which is arranged along the hosepipe 19 and is able to control/regulate the flow of fresh water from the water mains 13 towards the detergent dispensing assembly 12 or to the washing tub 3; a hosepipe 21 connecting the water mains 13 to the inlet of water softening device 18 which in turn has the outlet connected to the hosepipe 19 or directly to the detergent dispensing assembly 12 by means of a hosepipe 22; an electrically-controlled valve 23a, which is arranged along the hosepipe 21 and is designed to control/regulate the flow of fresh water from the water mains 13 towards the inlet of the water softening device 18 based on a control signal in order to cause the water softening device 18 to regulate/reduce the hardness degree of the softened water provided in its outlet; and preferably although not necessarily, an electrically-controlled valve 23b, which may be arranged along the hosepipe 22 and is designed to control/regulate the flow of softened water from the water softening device 18 towards the hosepipe 19. It should be understood that mix water may be provided for example by controlling the electrically-controlled valve 20 and 23b.

The electrically-controlled valves 20 and/or 23a and/or 23b may be on-off electric valves configured to be selectively controlled/activated so as to cause the softened, fresh or mix water to be selectively supplied to the detergent dispensing assembly 12/washing tub 3. It should be understood that electrically-controlled valves 20 and/or 23a and/or 23b may be controlled to selectively regulate the volume (liters) of fresh water crossing the hosepipe 19, and/or crossing the softening device 18 and/or the volume of water that the water softening device 18 provides to the hose 19 in order to mix the fresh water and softened water so as to provide mix water having a determined hardness degree.

The electrically-controlled valves 20 and/or 23a and/or 23b could be controlled so that the hardness degree of the softened or mix water is regulated based on a required value. It should in any case be understood that control of the hardness degree of the water may be not limited to the circuit above disclosed. For example the electrically-controlled valve 20, 23a, 23b may be not limited to on-off electric valves but according to possible different embodiments of the present invention, the electrically-controlled valve 20, 23a, 23b may be proportional valve or other kind of known valve electrically designed to be controlled to regulate a water flow rate. In accordance with one embodiment shown in FIG. 2, the laundry washing machine 1 may preferably, although not necessarily, comprise an electronic sensing system 32, which may comprise a number of sensor devices arranged along the hosepipes 19, 21, 22 to determine/measure hardness values which are indicative of the hardness degree of: the fresh water provided from the water mains 13 and/or the softened water provided in outlet by the water softening device 18, and/or the fresh/softened/mix water provided by the water softening system 14.

In accordance with the exemplary embodiment shown in FIG. 2, the sensor devices may be conductometric sensors arranged along the hosepipes 19, 21, 22 upstream from the detergent dispensing assembly 12.

According to an embodiment shown in FIG. 2, the water softening device 18 may be a ion-exchange device type. In accordance with one exemplary embodiment, the water softening device 18 may comprise a water-softening agent container 25, which is filled with a given amount of ion-exchange resins (not shown) capable to restrain the calcium and/or magnesium ions (Ca++ an Mg++) dissolved in the fresh water flowing across the water-softening agent container 25 and is preferably interposed between the hosepipes 21 and 22 to be crossed by the fresh water flowing from the valve 23a and the hosepipe 21. In accordance with one exemplary embodiment, the water softening device 18 may further comprise a regeneration-agent reservoir 26 which to structured for receiving a given amount (for example half a Kilogram or one Kilogram) of salt grains NaCl (Sodium Chloride) and is designed to uses brine to (i.e. saturated salty water) to periodically regenerate the ion-exchange resins contained in the water-softening agent container 25. Salty water, in fact, is able to replace from the ion-exchange resins the calcium and magnesium ions previously combined/fixed to the resins with Sodium ions (Na+).

The internal water softening device 18 may further preferably although not necessarily comprise: a water supply circuit 21a which is structured for selectively channeling, on command, a given amount of fresh water into the water-softening agent container 25 and regeneration-agent reservoir 26 so to at least partly dissolve the salt or other regeneration agents stored therein and form a given amount of brine (i.e. salt water); and a electrically-controlled valve 20a which is arranged along a hosepipe of the water supply circuit 21a and is designed to control/regulate the flow of fresh water from the water mains 13 towards regeneration-agent reservoir 26, an electrically-powered brine-circulating pump 26a which is interposed between the water-softening agent container 25 and the regeneration-agent reservoir 26 and is structured for transferring/moving the brine (i.e. the salt water) from the regeneration-agent reservoir 26 to the water-softening agent container 25 when activated.

Ion-removal internal water softening devices are disclosed, for example, in reference documents WO 2006 079 417 and/or EP 0 861 114 wherein a ion-removal internal water softening device comprised a system based on capacitive deionization technology which comprises electrodes having a conductive surface. The electrodes are chargeable in response to an applied DC potential. The electrodes are separated from each other by non-conductive spacers. The electrodes and the conductive surface on the electrodes may be constructed from conductive materials such as carbon or conductive polymers or combinations. Because the electrodes of the system based on capacitive deionization technology have a limited absorption capacity, the system requires regeneration, to remove the ions absorbed on the electrodes. The system based on capacitive deionization technology may be regenerated by flushing with fresh water, reversing the polarity the anode electrodes with the cathode electrodes. The interval for regeneration is also dependent on the concentration of ions in the feed water; the harder the feed water, the more frequent regeneration is required. The water produced during regeneration phase contains a high level of hardness (ions) and is therefore directed to a drain. The system based on capacitive deionization technology thereby provides water softening without addition or with a limited amount of chemicals for regeneration.

It should in any case be understood that water softening device 18 is not limited only to ion-removal devices type, but according to other possible embodiments of the present invention, it may comprise any kind of device/apparatus operating according to known water softening technologies. In accordance with an exemplary embodiment (not illustrated), the water softening device 18 may comprise: reverse osmosis systems/devices, nano-filtration systems/devices, distillation systems/devices such as membrane distillation systems/devices, boiling systems/devices, capacitive deionization systems/devices, electro-dialysis systems/devices and similar, enzymatic systems which are known and detailed description thereof will be omitted accordingly.

As illustrated in FIGS. 1, 2, 3, 5 and 7, the laundry washing machine 1 may further comprise a user control panel 28, which may be preferably, although not necessarily arranged in the front wall 2a of the casing 2 and is structured/configured to allow the user to input information being indicative of a laundry care washing program to be performed. The user control panel 28 may preferably comprise, for example, a LED or LCD or fluorescent type display or the like, and/or preferably acoustic devices designed to generate vocal/acoustic messages.

As illustrated in FIG. 2, the laundry washing machine 1 may further comprise an electronic control unit 15 which may be electrically connected to the control panel 28 in order to receive the information inputted by the user.

In accordance with a first embodiment shown in FIG. 3, the control panel 28 may be structured/configured to allow the user to select a laundry washing program among one or more of preset laundry care washing programs, i.e. cotton care washing program, synthetic care washing program (Polyamide PA, viscose, etc. . . . ), delicates care washing program, wool care washing program. Data relating to selectable/performable laundry care washing program/s may be preferably contained in a memory device 27 or any similar apparatus cooperating with the electronic control unit 15, and may comprise information associated with the kind of water (softened/fresh/mix), and/or hardness degree of the water to be supplied during each laundry washing phases of a laundry care washing program.

Preferably, one or more laundry care washing program may be programmed so as to perform a fresh water laundry washing phase during the main wash phase, and one or more mix water laundry washing phase/s and/or one or more softened water laundry washing phases during the secondary wash phases (Laundry care washing program F in FIG. 4).

Preferably, one or more laundry care washing program may be programmed so as to perform a mix or softened water laundry washing phase during the main wash phase, and one or more mix or softened or fresh water laundry washing phase/s during the secondary wash phases (Laundry care washing program C and D in FIG. 4).

Preferably, one or more laundry care washing program may be programmed so as to perform softened water laundry washing phases during both the main and the second wash phases (Laundry care washing program N in FIG. 4).

It should be point out that the present invention is not limited to the above reported examples of laundry care washing program. According to other embodiments, softened, mix and fresh water laundry wash phases is a laundry care washing program may have combinations/sequences which are different to the above disclosed examples.

According to an exemplary embodiment, memorized data of a "cotton care washing program" may comprise the following information: the main wash phase is a softened water washing phase, the first rinse phase is a fresh water washing phase, the second rinse phase is a fresh water washing phase, the final rinse phase is a fresh water washing phase.

According to a different exemplary embodiment, memorized data of a "cotton care washing program" may comprise the following information: the main wash phase is a softened water washing phase, the first rinse phase is a softened water washing to phase, second rinse phase is a softened water washing phase, and the last rinse phase is a mix water washing phase.

According to an exemplary embodiment, memorized of a "polyamide care washing program" may comprise the following information: the main wash phase is a softened water washing phase, the first rinse phase is a mix water washing phase, the second rinse phase is a mix water washing phase, and the last rinse phase is a mix water washing phase.

According to a different exemplary embodiment, memorized of a "polyamide care washing program" may comprise following information: the main wash phase is a softened water washing phase, the first rinse phase is a softened water washing phase, the second rinse phase is softened water washing phase, and the last rinse phase is a mix water washing phase.

According to an exemplary embodiment, memorized data relating to a "polyester care washing program" may comprise following information: the main wash phase is a mix water washing phase, the first rinse phase is a mix water washing phase, the second rinse phase is a mix water washing phase, and the last rinse phase is a mix water washing phase.

According to a different exemplary embodiment, memorized data of a "polyester care washing program" may comprise the following information: the main wash phase is a mix water washing phase, the first rinse phase is a fresh water washing phase, the second rinse phase is a fresh water washing phase, and the last rinse phase is a fresh water washing phase.

In this regard, it should be point out that Applicant's tests proved that greying effect on the washed laundry may be further reduced by performing the above cited "polyester care washing programs", using a liquid detergent or a washing powder without Zeolites (chemically classified as tridimensional Aluminosilicates.).

FIG. 4 illustrates a table which comprise on a column a number of laundry care washing programs A, B, . . . , N which could be implemented by the machine 1. As shown in FIG. 4, laundry care washing programs may be preferably configured so that: during the main wash phase, the softener system 14 is activated/controlled in the first operating state in order to provide/supply a softened or mix water so as to perform a softened or mix water washing phase, whereas during the secondary washing phase following the main wash phase i.e. the rinses phases and preferably the spin phase, the softener system 14 is controlled in order to selectively operate in the first or second or third state so as to provide softened, or fresh or mix water, respectively in order to perform softened water washing phase, or fresh water washing phase and the mix water washing phase.

Preferably, one or more performable laundry care washing programs may be programmed so that the first rinse phase is a softened water washing phase, whereas other performable laundry care washing programs may be programmed so that the last rinse phase is a fresh water washing phase.

Preferably, one performable laundry care washing program, i.e. a cotton care washing program may be programmed so that all the laundry wash phases, e.g. the main wash phase and secondary laundry wash phases correspond to softened water wash phases.

Figure 5:
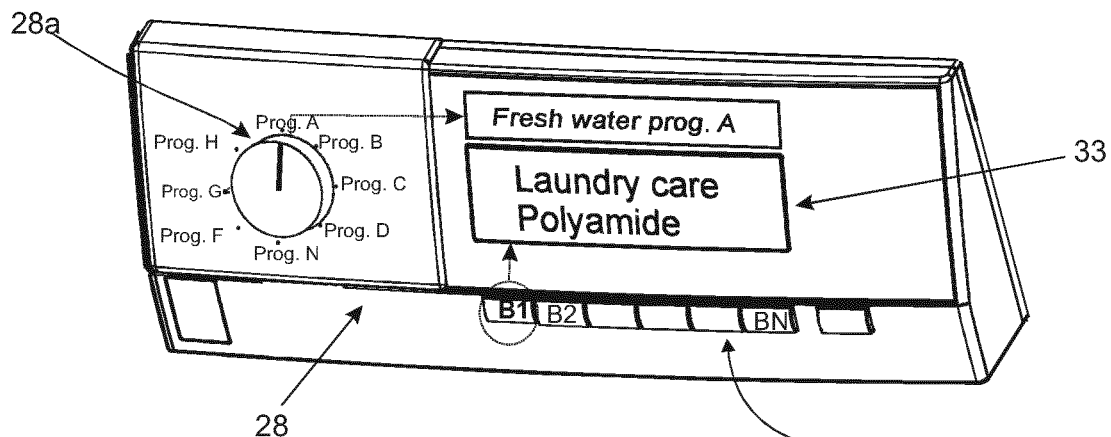
FIG. 5 schematically illustrates a second embodiment of an user control panel of the laundry washing machine illustrated in FIG. 1.

In accordance with a different embodiment shown in FIG. 5, the washing machine 1 may be provided with a control panel 28 structured/configured to allow the user to input first information indicative of a fresh water washing program to be performed, and second information indicative of one or more laundry care commands. The electronic control unit 15 is configured to determine/set the laundry care washing program based on received first and second information.

The control panel 28 may be configured to allow operator to input said second information indicative of a laundry care commands associated to kind of laundry to be washed. Preferably, the control panel 28 may be configured to allow operator to input said second information indicative of a laundry care commands which are associated to fabric/textile of the laundry, i.e. cotton, polyamide or the like. The electronic control unit 15 is configured to set/determine the laundry care program based on the selected fresh water laundry washing program and said laundry care commands.

In accordance with the exemplary embodiment shown in FIG. 5, the control panel 28 may comprise a first select part 28*a* configured to allow the user to select a fresh water washing program among one or more fresh water washing programs; and a second select part 28*b* is configured to allow the user to input one or more laundry care commands characterizing/defining the kind of laundry to be washed. i.e. the fabric/textile of the laundry.

The information associated with the fresh water washing programs selected by the first select part 28a may be contained in form of data memorized in the memory device 27. According to the embodiment illustrated in FIG. 5, the electronic control unit 15 may be configured to determine/set the laundry care washing program to be performed, based on the first information indicating the selected fresh water washing program and the second information relating to the selected laundry care commands that user has selected/requested.

Preferably, the electronic control unit 15 may set/determine the laundry care washing program by switching/replacing one or more fresh water washing phases of said selected fresh water laundry washing program, with one or more softened water laundry washing phases and/or mix water laundry washing phases, based on said laundry care commands.

In usage, during the laundry care washing program, the electronic control unit 15 activates/controls the water softening system 14 (depending on the kind of softening system 14 presents on the machine 1) based on the set laundry care washing program to cause softened water or mix water to be supplied during the main wash phase and/or one or more secondary laundry washing phase/s of the fresh water washing program.

As shown in the example of FIG. 5, the first select part 28a may comprise a rotation knob for supplying the selected signal containing the first information after sensing whether a program is selected through rotation, whereas the second select part 28b may comprise one or more buttons B1,BN for supplying the selected signal containing the second information after sensing whether a laundry care command has been selected. It should in any case be understood that the first select part 28a and second select part 28b are not limited to the example illustrated in FIG. 5, but could comprise other kind of known input devices such as, for example, a touch panel's.

Figure 6:
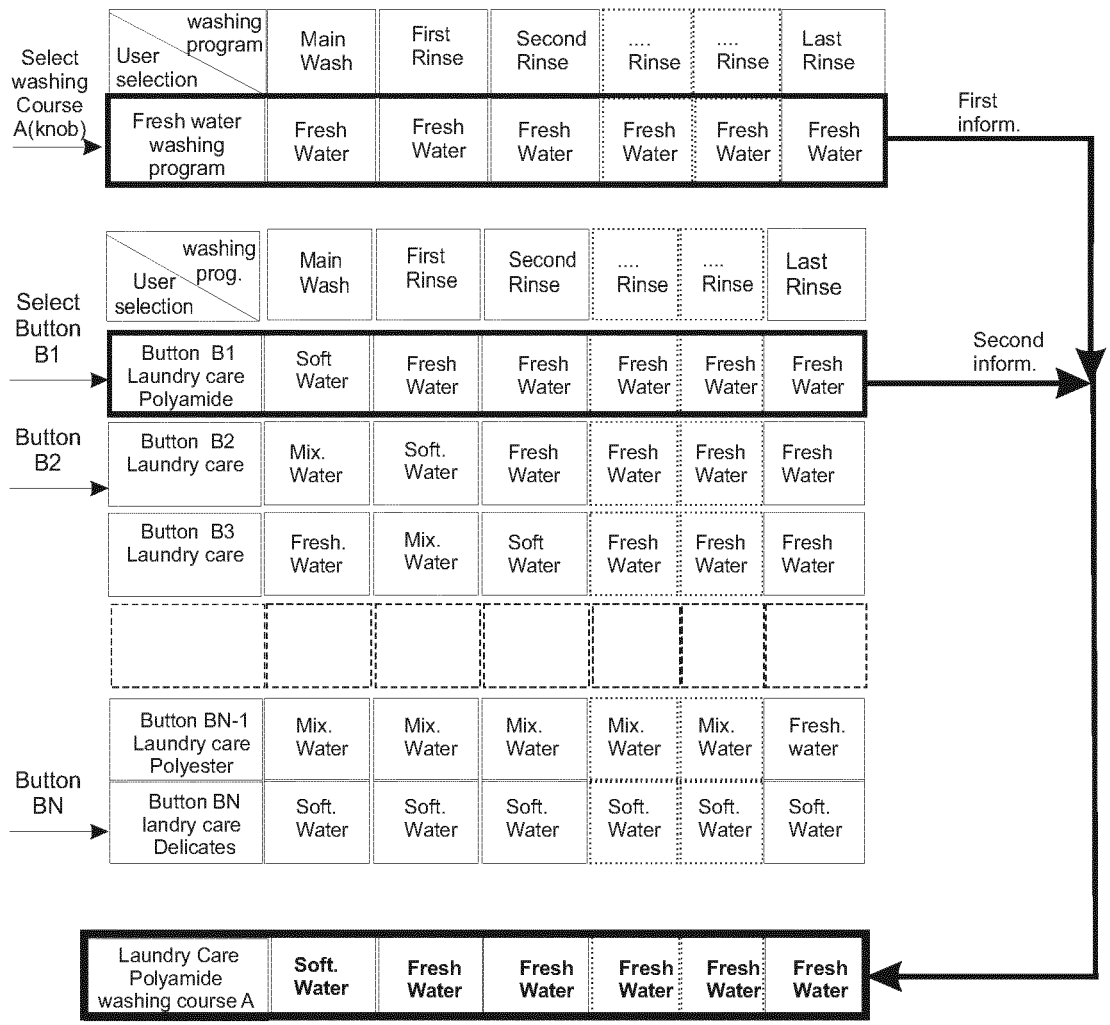
FIG. 6 shows an example of a table containing laundry care washing programs selectable by the control panel illustrated in FIG. 5.

In the example shown in FIGS. 5 and 6, if the buttons B1, BN are not pushed, the electronic control unit 15 may set the "standard" fresh-water washing program so as to load the fresh water during all the washing phases.

When one buttons B1-BN is pushed, the electronic control unit 15 determine the laundry care information associated with the button and modifies the fresh water washing program in the "laundry care washing program" by changing/switching/replacing the kind of water to be supplied during the washing phases. Kind of water (mix or soft or fresh) to be supplied during the washing phases, may be determined by the electronic control unit 15 on the basis of the laundry information associated with the pushed button B1, . . . , BN.

For example, the button B1 may be associated with polyamide and when pushed may cause the softened water to be supplied during the first rinse, and the button BN may be associated with another type of laundry and when pushed may cause the softened water to be supplied during the last rinse.

It should in any case be understood that buttons of the second select part 18b may be configured to cooperate with the electronic control unit 15 in order to allow the user to select combinations of the kind of fabric of the laundry in order to define the more suitable laundry care washing program.

It should be point out that according to a possible embodiment, the electronic control unit 15 and control panel 28 may be configured in order that the user may change the kind of water (mix or softened or fresh) so as to set laundry care washing program, by repeatedly pressing a determined button a prefixed number of times. For example, pressing repeatedly the button B1 twice may cause the softened water to be supplied during the main wash phase, pressing repeatedly the button B2 twice may cause the softened water to be supplied during the first rinse phase, pressing repeatedly the button B3 twice may cause the softened water to be supplied during the second rinse phase. For example, the control panel 28 may be configured so that button B1, BN may cause selection of any prefixed combination of mix or softened or fresh water in washing phases.

Of course, according to a different embodiment, the control panel 28 may have one button and be configured so that change of kind of water (mix or softened or fresh) in washing phases may be determined based on number of time that button is repeatedly pressed.

FIGS. 7 and 8 illustrate a third exemplary embodiment which differs from the second embodiment because the first select part 28a is configured to allow the user to select a laundry washing program among a plurality of softened water washing programs, and the second select part 28b is configured to allow the user to select a laundry care command/function.

Information about softened water washing programs may be contained in memory device 27 and comprise data relating to kind of water (softened, mix and fresh water) to be supplied during the washing phases. Preferably the softened water laundry washing program comprises at least a softened water laundry washing phase or mix water washing phase.

The electronic control unit 15 may be configured to set the laundry care washing program based on the first information indicating the selected softened water washing program and the second information relating to the laundry care command/function that user has requested by means of the second select part 28b. As shown in the example of FIG. 7, the first select part 28a may comprise a rotation knob, whereas the second select part 28b may comprise at least one button for supplying the selected signal containing the second information, i.e. laundry care command/s and/or functions. In the example shown in FIGS. 7 and 8, if the button is not pushed, the electronic control unit 15 may perform the softened water washing program selected by user, so as to load the softened water during the prefixed laundry washing phases. Preferably the electronic control unit 15 is further configured to determine/set the laundry care washing program by replacing one or more mix or fresh water washing phases of the softened water washing program with softened water washing phases ad/or mix water laundry washing phases respectively, based on said laundry care commands, and control said water softening system 14 in response to the set laundry care washing program to supply softened water during at least the main laundry wash phase and/or softened/mixed water during one or more of the secondary laundry wash phase/s.

When the button is not pushed, electronic control unit 15 performs the softened water washing program selected by the first select part 28a.

On the contrary, when the button is pushed, the electronic control unit 15 modifies the softened water washing program so as to define a prefixed "laundry care washing program" to be performed, control the water softening system 14 so as to supply softened water or mix water during the main wash phase, and in order to selectively supply mix or softened or fresh water during the following rinse phase/s. Preferably, the electronic control unit 15 may replace one or more mix or fresh water washing phases of the softened water washing program with softened water washing phases ad/or mix water laundry washing phases respectively, based on the laundry care command associated with the pushed button.

It should be further point out that according to a possible embodiment, the electronic control unit 15 and control panel 28 may be configured in order that the user may select the laundry care commands, by repeatedly pressing a determined button a prefixed number of times. For example pressing repeatedly the button twice may cause the softened water washing program to be modified in a high care washing program. In that case, for example, the electronic control unit 15 may change the fresh water supplied during a prefixed wash phase of the softened water washing program with a mix water. For example pressing repeatedly the button three times may cause the softened water washing program to be modified in a top care washing program. In that case, for example, the electronic control unit 15 may change the mix water supplied during a prefixed wash phase of the softened water washing program with a softened water.

Figure 9:
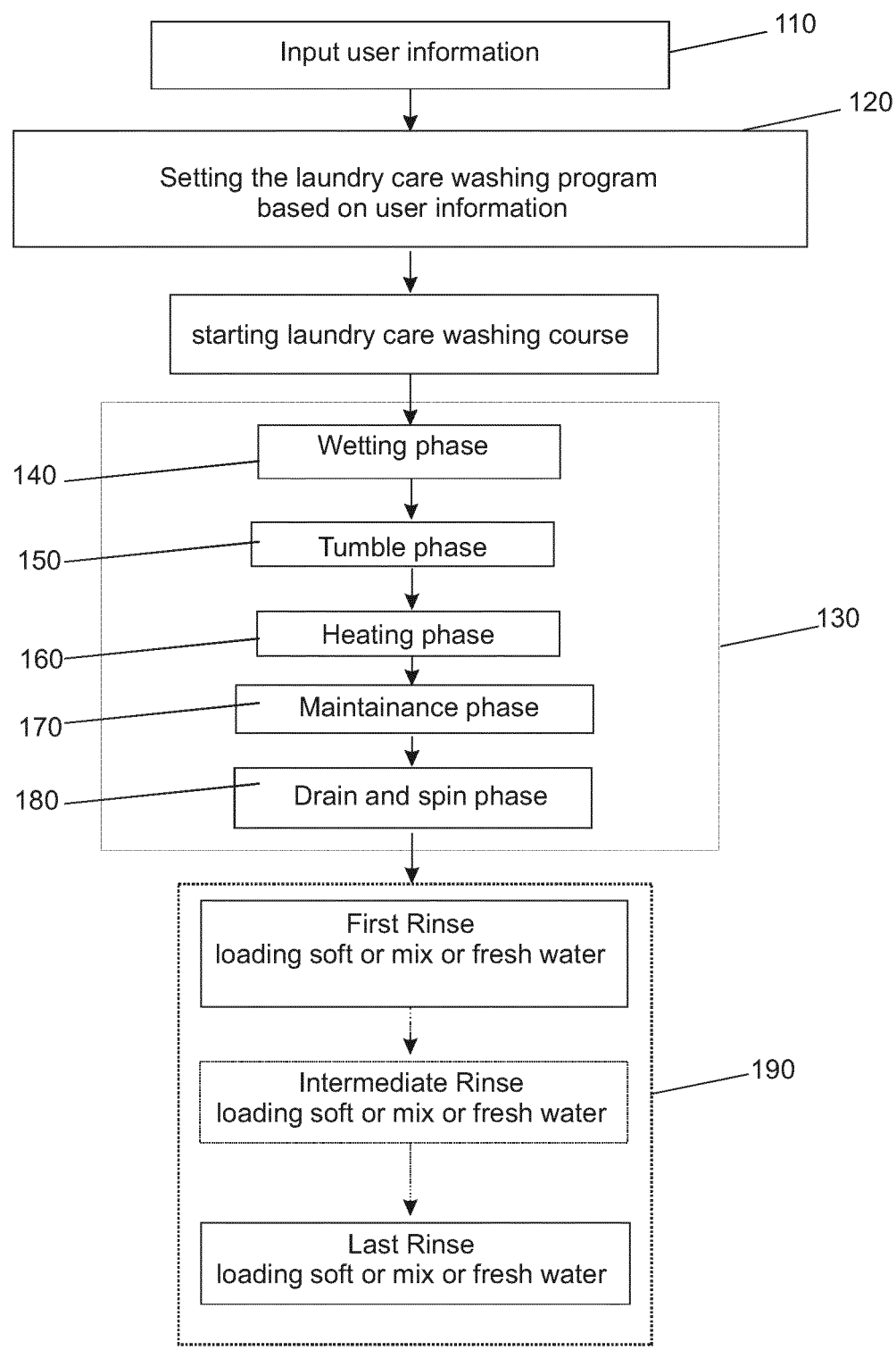
FIG. 9 is a flow chart containing the operation performed by the laundry washing machine of an aspect of the present invention.

Next, the operation performed by laundry washing machine 1 according to aspects of the present invention will be explained in FIG. 9 which illustrates an outline operation flow chart.

In step 110, user inputs via the control panel 28 the information indicative of the laundry care washing program to be performed. As above disclosed, in this step user could select directly the laundry care washing program among one or more memorized washing programs as illustrated in the example of FIGS. 1 and 3, or inputs the first and second information as illustrated in the second embodiment of FIG. 5 or the third embodiment of FIG. 7.

The electronic control unit 15 determines in the memory device 27 all data/information about the kind of water (softened or mix or fresh water) and/or the prefixed hardness of the water, to be supplied during each laundry washing phase, i.e. main wash phase and the rinse phases of the selected laundry washing program, based on the set laundry care washing program (step 120).

After that, in step 130, electronic control unit 15 may start performing the main wash phase of the laundry care washing program. Hereinafter, it will be supposed that user has selected a laundry care washing program, i.e. cotton care washing program, wherein the main wash phase is performed by using softened water, and the secondary wash phases using softened water.

During the wetting step (step 140) of the main wash phase, the electronic control unit 15 activates/controls the softener system 14 so as to supply a softened water into the detergent dispensing system 12 to cause the detergent to be flushed from the detergent dispensing system 12 into the washing tub 3. At this time, the electronic control unit 15 may preferably although not necessarily control the valves 20, and/or 23a and/or 23b so as to selectively regulate flows/volumes of fresh water crossing the hosepipes 19, 21 and 22 and passing through the water softening agent container 25, based on the amount of softened water to be supplied and/or the hardness degree of the softened water. Preferably although not necessarily, if the laundry washing machine 1 comprises an electronic sensing system 32, the electronic control unit 15 may control the valves 20, and/or 23a and/or 23b based on a comparison between the prefixed hardness degree and the measured water hardness degree. Of course, if the auto-dosing device 12b is present, the electronic control unit 15 may control the auto-dosing device 12b to automatically supply a prefixed detergent amount into the washing tub 3. In one embodiment, the main wash phase may comprise a drum tumbling step, wherein electronic control unit 15 controls the electric motor to assembly 6 so as to rotate the drum 4 such that the laundry is tumbled/wetted and detergent is dissolved in the softened water loaded in the tub 3 (step 150). In this step, the electronic control unit 15 may further control the softener system 14 in order to supply softened water directly to the washing tub 3 until a prefixed water level is reached. In one embodiment electronic control unit 15 could control the flow diverter, if present, to supply softened water directly to the washing tub 3.

After the prefixed water level is reached, the electronic control unit 15 may continue to control the rotation of the drum 4 to perform the tumbling movements of the laundry inside of the drum 4 and preferably starts heating step wherein it preferably controls the heating device 11 (step 160).

Next, in step 170, the electronic control unit 15 preferably switches off the heating device 11 if the latter is on, and starts performing a maintenance phase wherein the rotation of drum 4 is controlled in order to perform the tumbling movements of the laundry inside of the drum 4.

Next, in step 180, the main wash phase, performs drain and preferably, although not necessarily spin steps. In the drain step, the electronic control unit 15 controls the water draining system 8 to drain the washing water from the washing tub 3, whereas in the spin step the electronic control unit 15 preferably controls the motor assembly 6 so as to spin the drum 4 at high speed one or more times.

After performing the drain and spin steps, in step 190, the electronic control unit 15 performs a prefixed number of rinse phases during which the electronic control unit 15 may activate/control the water softener system 14 in order to selectively supply softened, or mix, or fresh water to the washing tub 3 according to the selected/set laundry care washing program. Preferably when it is required a reduction of greying phenomenon for a kind of fabric, i.e. cotton, the electronic control unit 15 may activate/control the softener system 14 to supply softened water in any rinse phase, whereas on the contrary, if the reduction of greying phenomenon is not required, the electronic control unit 15 may control the softener system 14 to supply mix or fresh water during the rinse phases. In accordance with one embodiment, rinse phases performed after the main wash phase may comprise the step to selectively supplying a softened or mix or fresh water to the washing tub 3 preferably, although not necessarily, through a main wash compartment (not illustrated) of the detergent dispensing assembly 12. The first rinse phase may also comprise a rinse maintenance step, wherein the electronic control unit 15 controls the motor assembly 6 in order to rotate the drum 4 so that the laundry is tumbled inside the drum 4, and a drain and spin step wherein the rinse water is removed from the laundry.

It has thus been shown that the present invention allows all the set objectives to be achieved.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

The invention claimed is:

1. A laundry washing machine comprising:
an outer casing;

a washing tub, arranged inside the casing;
a rotatable drum, arranged in axially rotating manner inside the washing tub and is designed to receive laundry to be washed;
a detergent dispensing assembly, designed for supplying laundry detergent into the washing tub;
a water softening system, designed to receive fresh water from a water mains and reduce the hardness degree of the fresh water in order to supply softened water or mix water to the detergent dispensing assembly and/or to the washing tub, during one or more softened water laundry washing phases or respectively during one or more mix water laundry wash phase, said mix water being a mixture of fresh water and softened water;
a control panel configured to allow an operator to input information associated with the laundry to be washed, the input information including:
a selected fresh water washing program including a fresh water washing phase and a fresh water rinsing phase, and
a selected laundry care program including at least one of a softened water washing phase, a softened water rinse phase, a mix water washing phase, or a mix water rinsing phase; and
an electronic control means configured to receive said laundry information and control said water softening system in order to produce a washing cycle for controlling the laundry washing machine by replacing at least one of the fresh water washing phase or the fresh water rinsing phase of the selected fresh water washing program with the at least one of the softened water washing phase, the softened water rinse phase, the mix water washing phase, or the mix water rinsing phase of the selected laundry care program.

2. The laundry washing machine according to claims 1, wherein said laundry information are set based on the fabric of the laundry to be washed.

3. The laundry washing machine according to claim 1, wherein said control panel is configured to allow operator to select a washing program among one or more predetermined laundry care washing programs, wherein laundry care washing programs comprises one or more softened water laundry washing phase/s and/or one or more mix water laundry wash phases.

4. The laundry washing machine according to claim 1, wherein said washing program comprises a main laundry wash phase and one or more secondary laundry wash phases following the main laundry wash phase; said main laundry wash phase comprises at least a wetting phase, a maintenance phase and a drain phase; said secondary laundry wash phases comprising one or more rinse phases which start after the end of said drain phase of the main laundry wash phase.

5. The laundry washing machine according to claim 4, wherein said predetermined laundry care washing programs comprise: performing a fresh water laundry washing phase during the main wash phase, and performing one or more mix water laundry washing phase/s and/or one or more softened water laundry washing phases during the secondary wash phases.

6. The laundry washing machine according to claim 4, wherein said predetermined laundry care washing programs comprise: performing a mix or softened water laundry washing phase during the main wash phase, and performing one or more mix or softened or fresh water laundry washing phase/s during the secondary wash phases.

7. The laundry washing machine according to claim 4, wherein predetermined laundry care washing programs comprises performing softened water laundry washing phases during the main and the second wash phases.

8. The laundry washing machine according to claim 5, comprising memory means containing data relating to one or more laundry care washing programs, said memorized data being indicative of loading of softened water or fresh water or mix water to the detergent dispensing assembly and/or the washing tub during corresponding laundry washing phases of laundry care washing programs;
said electronic control means being configured to selectively control/activate said water softening system based on said selected laundry care washing program.

9. The laundry washing machine according to claim 1, wherein said control panel comprises:
a first select part configured to allow operator to input first information indicative of a laundry washing program;
a second select part configured to allow operator to input second information indicative of one or more laundry care commands;
said electronic control means being configured to determine/set a laundry care washing program to be performed based on received first and second information.

10. The laundry washing machine according to claim 9, wherein said first select part is configured to allow operator to select a laundry washing program among one or more predetermined fresh water laundry washing programs, wherein said fresh water laundry washing program comprises only fresh water washing phases;
said electronic control means being further configured to set the laundry care washing program based on the selected fresh water laundry washing program and said laundry care commands.

11. The laundry washing machine according to claim 10, wherein said electronic control means are further configured to set the laundry care washing program by replacing one or more fresh water washing phases of the selected fresh water washing program with respective softened water washing phases ad/or mix water laundry washing phases, based on said laundry care commands, and control said water softening system in response to the set laundry care washing program.

12. The laundry washing machine according to claim 9, wherein said first select part is configured to allow operator to select a laundry washing program among one or more predetermined softened water laundry washing programs, wherein a softened water laundry washing program comprises at least a softened or mix water laundry washing phase; said electronic control means being further configured to set said laundry care washing program based on the selected softened water laundry washing program and said laundry care commands.

13. The laundry washing machine according to claim 12, wherein said electronic control means is further configured to determine/set the laundry care washing program by replacing one or more mix or fresh water washing phases of the softened water washing program with softened water washing phases ad/or mix water laundry washing phases respectively, based on said laundry care commands; and control said water softening system in response to the set laundry care washing program.

14. The laundry washing machine according to claim 1, wherein softened water has a reduced hardness degree which is lower than about 15 FH.

15. The laundry washing machine according to claim 1, wherein softened water has a reduced hardness degree which is lower or equal than about 5 FH.

16. The laundry washing machine according to claim 1, wherein softened water has a reduced hardness degree which is lower or equal than about 2 FH.

17. The laundry washing machine according to claim 1, wherein softened water has a reduced hardness degree which is lower or equal than about 1 FH.

18. The laundry washing machine according to claim 1, wherein mix water has a reduced hardness degree which is greater than, or equal to about 15 FH, and lower than, or equal to about 25 FH.

19. The laundry washing machine according to claim 1, wherein said water softening system comprises a water-softening agent container, which is filled with a given amount of ion-exchange resins capable to restrain the calcium and/or magnesium ions dissolved in the fresh water flowing across the water-softening agent container, and a regeneration-agent reservoir which is structured for receiving a given amount of salt grains and is designed to uses brine to periodically regenerate said ion-exchange resins contained in said water-softening agent container.

20. The laundry washing machine according to claim 1, wherein the water softening system comprises at least a system based on capacitive deionization technology.

21. The laundry washing machine according to claim 1, wherein a laundry care washing program comprises a cotton care washing program, in which: the main wash phase is a softened water washing phase and the final rinse phase of the secondary laundry wash phases is a fresh water washing phase.

22. The laundry washing machine according to claim 1, wherein a laundry care washing program comprises a cotton care washing program, in which: the main wash phase is a softened water washing phase, the first rinse phase is a softened water washing phase, second rinse phase is a mix water washing phase, and the final rinse phase is a mix water washing phase.

23. The laundry washing machine according to claim 1, wherein laundry care washing program comprises a polyamide care washing program, in which: the main wash phase is a softened water washing phase, and the final rinse phase of the secondary laundry wash phases is a fresh water washing phase.

24. The laundry washing machine according to claim 1, wherein laundry care washing program comprises a polyamide care washing program in which: the main wash phase is a softened water washing phase, the first rinse phase is a mix water washing phase, the second rinse phase is mix water washing phase, and the final rinse phase is a mix water washing phase.

25. The laundry washing machine according to claim 1, wherein electronic control means are configured to control said water softening system based on said input laundry information, and to supply water to the detergent dispensing assembly and/or to the washing tub during all the washing phases, wherein said supplied water has a hardness degree lower than said fresh water.

* * * * *